US009481274B2

United States Patent
Laird et al.

(10) Patent No.: US 9,481,274 B2
(45) Date of Patent: Nov. 1, 2016

(54) VEHICLE ARMREST WITH STRUCTURAL FABRIC SUBSTRATE

(71) Applicant: Ford Global Technologies, LLC, Dearborn, MI (US)

(72) Inventors: Kenneth S. Laird, Canton, MI (US); Linh Doan, Belleville, MI (US); Yudong Zhou, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/969,377

(22) Filed: Dec. 15, 2015

(65) Prior Publication Data

US 2016/0096457 A1    Apr. 7, 2016

Related U.S. Application Data

(63) Continuation of application No. 14/108,619, filed on Dec. 17, 2013, now Pat. No. 9,254,765.

(51) Int. Cl.
| | |
|---|---|
| *B60N 2/46* | (2006.01) |
| *B60N 2/427* | (2006.01) |
| *B60R 13/02* | (2006.01) |
| *B60R 21/04* | (2006.01) |

(52) U.S. Cl.
CPC ............ *B60N 2/46* (2013.01); *B60N 2/42709* (2013.01); *B60N 2/466* (2013.01); *B60R 13/0243* (2013.01); *B60R 21/0428* (2013.01)

(58) Field of Classification Search
CPC .......... B29C 31/008; B29C 45/14008; B29C 45/14016; B29C 45/14024; B29C 45/14065; B29C 45/14262; B29C 45/14786; B29C 45/14819; B29C 2045/1404; B29C 2045/1427; B29C 2045/14278; B29C 70/68; B29C 70/683; B29C 70/687; B29C 70/688; B29C 70/70; B29C 70/72; B29C 70/74; B29C 70/76; B60N 2/4235; B60N 2/42709; B60N 2/46; B60N 2/466; B60R 13/0243; B60R 21/0428; B60R 2021/0414; Y10T 29/49863

See application file for complete search history.

(56) References Cited

U.S. PATENT DOCUMENTS

| | | | |
|---|---|---|---|
| 3,362,749 A | | 1/1968 | Clement |
| 3,387,881 A | | 6/1968 | Stepanek et al. |
| 3,644,165 A | * | 2/1972 | Chen ................. B29C 70/086 156/177 |
| 4,386,989 A | * | 6/1983 | Aubry ............... B29C 70/083 156/182 |
| 4,743,323 A | * | 5/1988 | Hettinga ........... B29C 45/1418 156/160 |
| 4,783,114 A | | 11/1988 | Welch |
| 5,181,759 A | | 1/1993 | Doolittle |
| 5,527,084 A | | 6/1996 | Scherf |

(Continued)

FOREIGN PATENT DOCUMENTS

| | | | | |
|---|---|---|---|---|
| DE | 1117375 B | * | 11/1961 | ............ B29C 70/16 |
| DE | 3726827 A1 | * | 3/1988 | ............ B32B 15/02 |

(Continued)

*Primary Examiner* — Glenn Dayoan
*Assistant Examiner* — Paul Chenevert
(74) *Attorney, Agent, or Firm* — Vichit Chea; Price Heneveld LLP

(57) ABSTRACT

A vehicle armrest includes an inner armrest substrate having at least one buckling member extending to an outer armrest substrate. A gap is defined by the inner and outer armrest substrates and the at least one buckling member. A fabric member extends across the gap and is attached to the inner and outer armrest substrates. A cover member extends over and is vertically supported by the fabric member.

20 Claims, 15 Drawing Sheets

(56) References Cited

U.S. PATENT DOCUMENTS

| | | | |
|---|---|---|---|
| 5,765,804 A * | 6/1998 | Stumpf | A47C 1/03 248/161 |
| 5,776,568 A * | 7/1998 | Andress | B01D 53/0415 123/519 |
| 5,803,415 A | 9/1998 | Konishi et al. | |
| 5,939,165 A * | 8/1999 | Oike | B32B 27/08 264/46.5 |
| 6,475,576 B1 * | 11/2002 | Ashtiani | B32B 5/18 264/113 |
| 6,830,443 B1 * | 12/2004 | Coffey | B29C 44/1271 249/95 |
| 6,893,077 B1 | 5/2005 | DeJongh | |
| 7,070,221 B2 | 7/2006 | Cowelchuk et al. | |
| 7,104,590 B2 | 9/2006 | Dooley et al. | |
| 7,121,611 B2 | 10/2006 | Hirotani et al. | |
| 7,240,957 B2 * | 7/2007 | Dry | B60R 13/0243 29/91.1 |
| 7,247,382 B2 * | 7/2007 | Gardner, Jr. | B29C 37/0032 428/423.3 |
| 7,357,443 B2 | 4/2008 | Wolff et al. | |
| 7,387,326 B2 | 6/2008 | Osada | |
| 7,503,621 B2 | 3/2009 | Mani | |
| 7,658,426 B2 * | 2/2010 | Hayakawa | B29C 33/14 296/39.1 |
| 7,677,873 B2 * | 3/2010 | Sayers | B29C 31/008 264/257 |
| 7,681,939 B2 | 3/2010 | Augustyn | |
| 7,726,726 B2 | 6/2010 | Cavallin et al. | |
| 7,731,268 B2 | 6/2010 | Motowski et al. | |
| 7,794,009 B2 | 9/2010 | Pinkerton et al. | |
| 7,794,010 B2 | 9/2010 | Saida et al. | |
| 7,828,388 B2 | 11/2010 | Thomas | |
| 7,871,119 B2 | 1/2011 | Schoemann et al. | |
| 8,157,309 B2 | 4/2012 | Ishikawa | |
| 8,172,311 B2 | 5/2012 | Hughes, Jr. et al. | |
| 8,424,954 B2 | 4/2013 | Hall et al. | |
| 9,114,773 B2 | 8/2015 | Sundararajan et al. | |
| 9,120,407 B2 | 9/2015 | Gutierrez Diez et al. | |
| 9,120,449 B2 | 9/2015 | Gutierrez Diez et al. | |
| 9,145,076 B2 | 9/2015 | Platzek et al. | |
| 2005/0186388 A1 | 8/2005 | Mekas et al. | |
| 2006/0024474 A1 * | 2/2006 | Coffield | A47C 7/282 428/131 |
| 2007/0035064 A1 * | 2/2007 | Coffield | A47C 7/282 264/257 |
| 2007/0207292 A1 | 9/2007 | Cowelchuk et al. | |
| 2008/0038569 A1 * | 2/2008 | Evans | B60N 2/68 428/474.9 |
| 2011/0133531 A1 | 6/2011 | Yeh | |
| 2012/0231215 A1 * | 9/2012 | Hayashi | B60R 13/0243 428/138 |
| 2016/0167550 A1 * | 6/2016 | Doan | B60N 2/427 297/411.21 |
| 2016/0176366 A1 * | 6/2016 | Sperl | B60R 13/0243 296/1.08 |

FOREIGN PATENT DOCUMENTS

| | | | |
|---|---|---|---|
| DE | 102007027795 | 8/2008 | |
| DE | 102008053232 | 7/2010 | |
| EP | 1621385 A1 * | 2/2006 | B29C 45/14262 |
| FR | 1455474 A * | 4/1966 | B29B 15/08 |
| GB | 2514356 | 11/2014 | |
| WO | WO 2009016609 A1 * | 2/2009 | B62J 1/00 |
| WO | WO 2011078021 A1 * | 6/2011 | B29C 33/14 |
| WO | 2012028605 | 3/2012 | |

* cited by examiner

VEHICLE ARMREST WITH STRUCTURAL FABRIC SUBSTRATE

CROSS-REFERENCE TO RELATED APPLICATION

The present application is a continuation of U.S. patent application Ser. No. 14/108,619 filed Dec. 17, 2013, entitled VEHICLE ARMREST WITH STRUCTURAL FABRIC SUBSTRATE.

FIELD OF THE INVENTION

The present invention generally relates to vehicle armrests, and more specifically, a vehicle armrest where at least a portion of the vertical support is provided by a fabric substrate.

BACKGROUND OF THE INVENTION

Vehicles contain various styles of armrests within door assemblies and also within side panels, where no door is present. Various armrests can include additional cushioning and handles, as well as other features such as storage compartments and cup holders. Because armrests project into the cabin space of the vehicle, they can present a potential hazard during a side impact condition placed upon the vehicle. In such an impact, the armrest can be forced further into the cabin area as a result of the impact.

SUMMARY OF THE INVENTION

According to at least one aspect of the present invention, a vehicle armrest includes an inner armrest substrate having at least one buckling member extending to an outer armrest substrate. A gap is defined by the inner and outer armrest substrates and the at least one buckling member. A fabric member extends across the gap and is attached to the inner and outer armrest substrates. A cover member extends over and is vertically supported by the fabric member.

In at least another aspect of the present invention, a vehicle armrest includes an armrest substrate having an inner structure and an outer structure with a gap defined therebetween. A fabric member extends across the gap. A cushion member is disposed on the armrest substrate and is at least partially supported from below by the fabric member.

In at least another aspect, a vehicular armrest includes an armrest substrate having a plurality of buckling members that define a gap within the armrest substrate. A cover member is attached to the armrest substrate. A fabric member is attached to the armrest substrate and positioned under the cover member. The fabric member spans the gap and provides vertical support to portions of the cover member proximate the gap.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
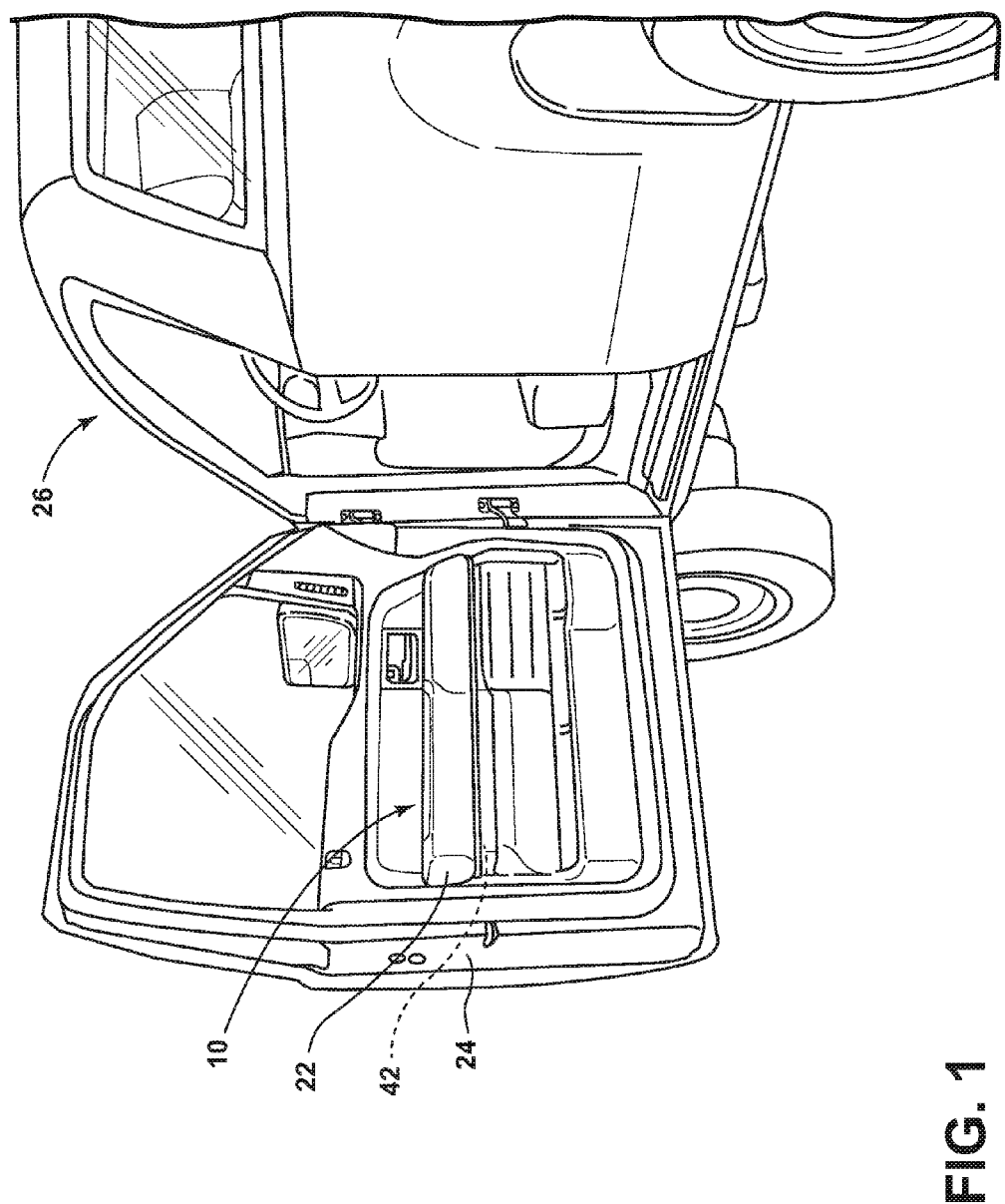
FIG. 1 is a rear side perspective view of a vehicle with a door in the open position and with an embodiment of the fabric substrate armrest installed.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a vehicular fabric substrate armrest including an inner armrest substrate 12 and having at least one buckling member 14 that extends to an outer armrest substrate 16. A gap 18 is defined by the inner and outer armrest substrates 12, 16 and the at least one buckling member 14. A fabric member 20 extends across the gap 18 and is attached to the inner and outer armrest substrates 12, 16. A cover member 22 extends over, and is vertically supported by, the fabric member 20.

Referring again to the embodiment of FIG. 1, the fabric substrate armrest 10 is installed within a door 24 of a vehicle 26 proximate the location of the occupant's elbow and arm to provide vertical support to the occupant's arm while in the vehicle 26. It is contemplated that the fabric substrate armrest 10 can also be disposed at the interior side panels of a vehicle 26 to provide arm support for occupants in seating locations that do not have a door 24 adjacent thereto. Such locations can include, but are not limited to, a rear seat in a two-door vehicle, a third-row seat in a four-door vehicle, a center console, and other similar locations.

Figure 2:
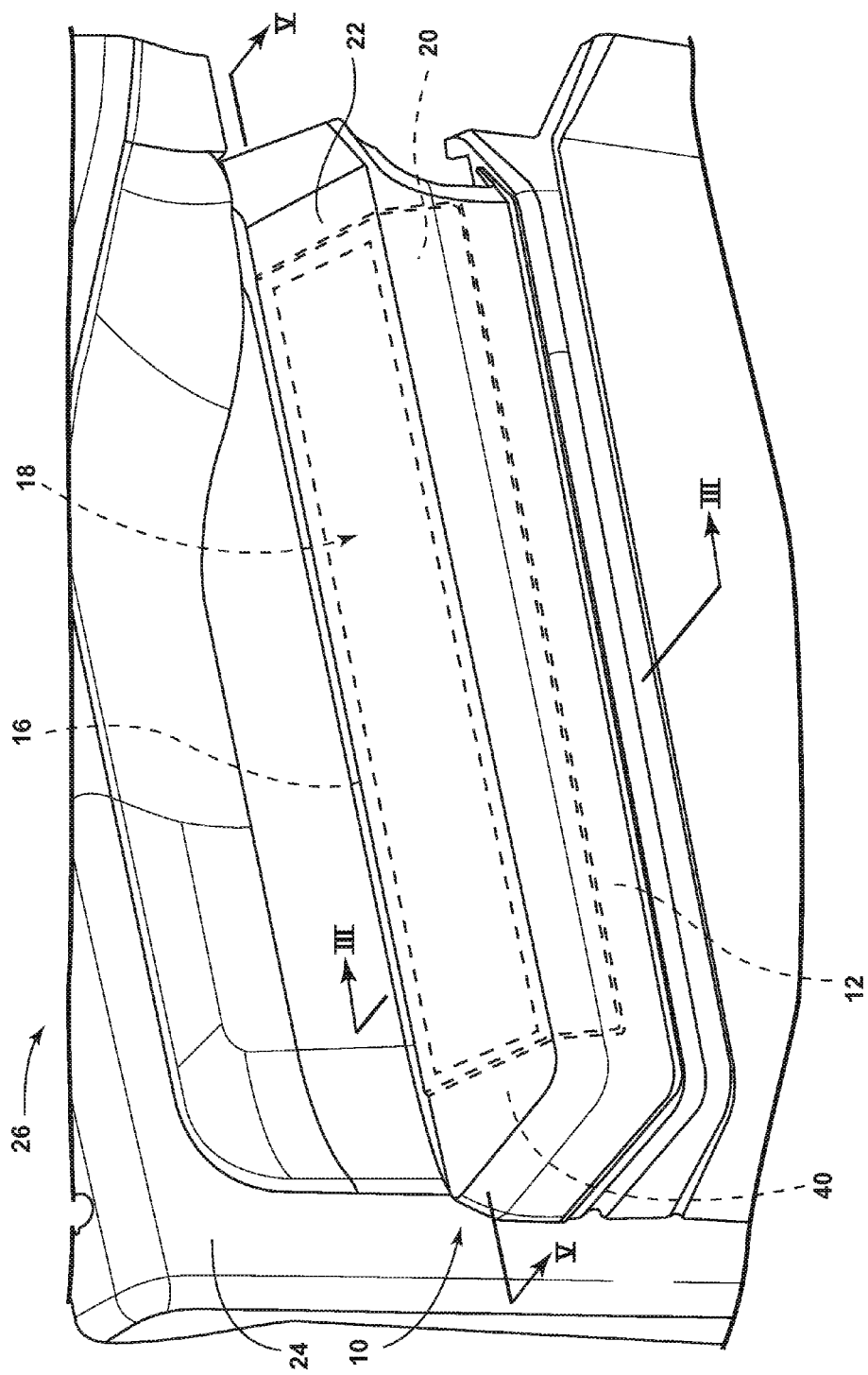
FIG. 2 is a top perspective view of one embodiment of the fabric substrate armrest.
Figure 3:
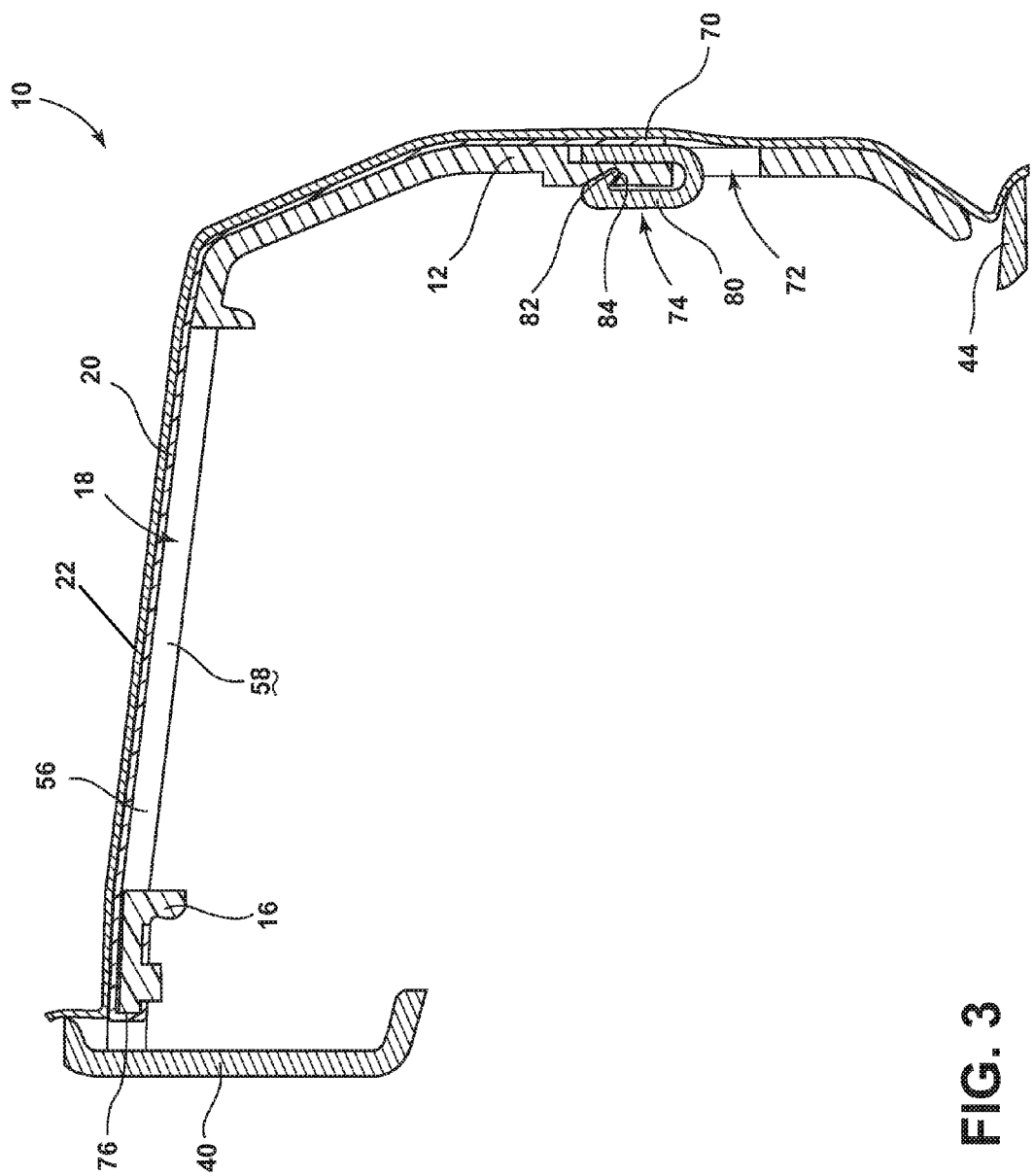
FIG. 3 is a cross-sectional view of the fabric substrate armrest of FIG. 2 taken at line III-III.
Figure 4:
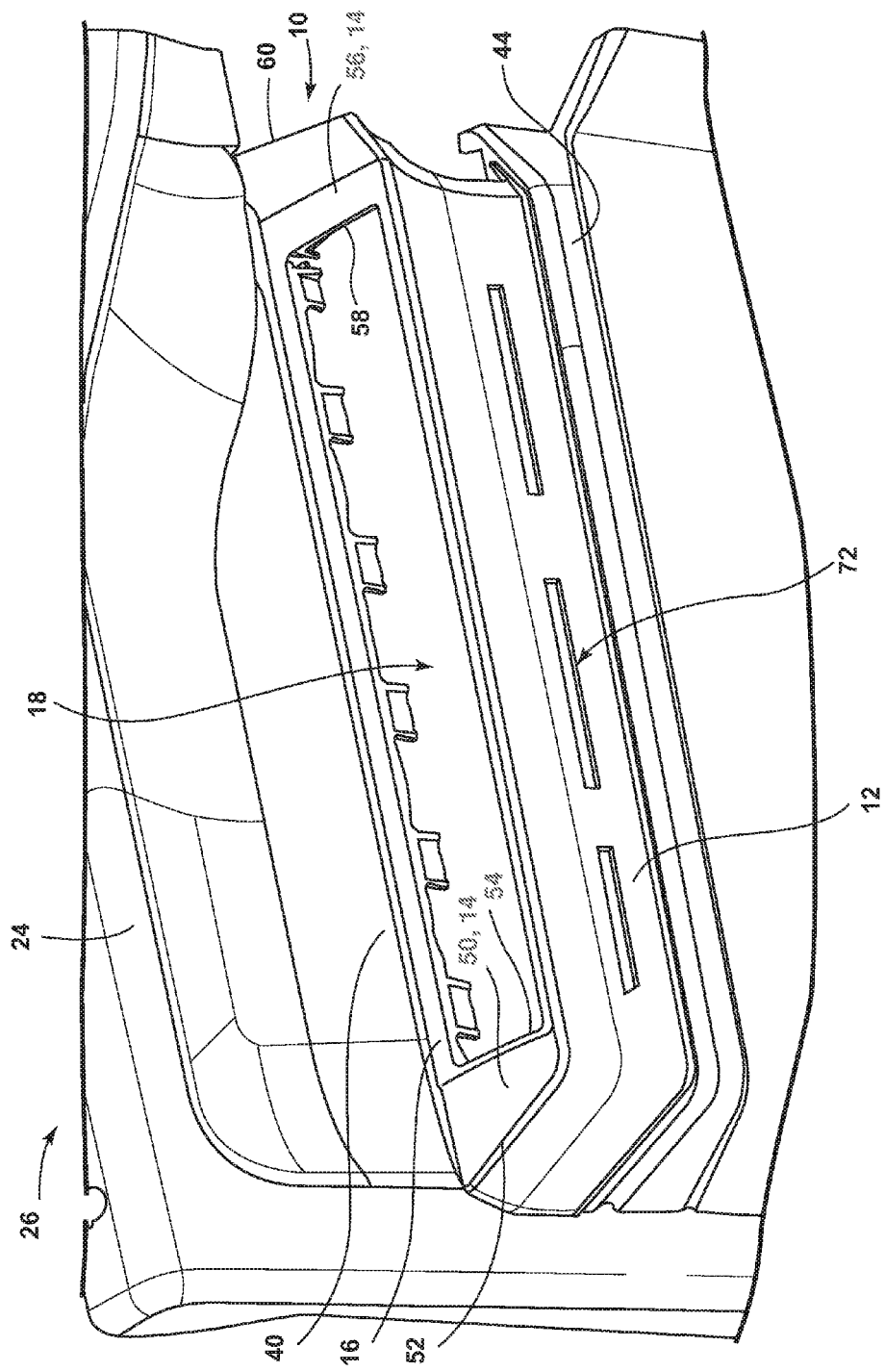
FIG. 4 is a partially exploded perspective view of the fabric substrate armrest of FIG. 2 with the cover and fabric member removed.
Figure 5:
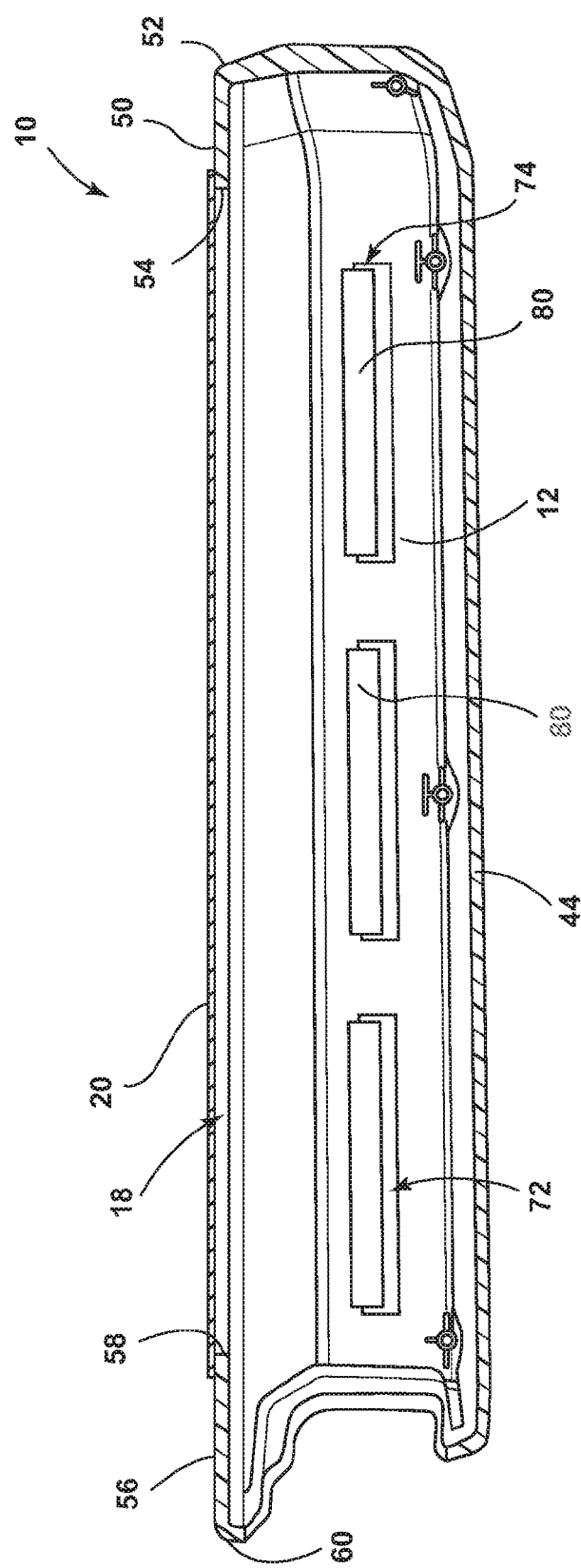
FIG. 5 is a cross-sectional view of the fabric substrate armrest of FIG. 2 taken at line V-V.

Referring again to the embodiment of FIGS. 2-4, the inner armrest substrate 12 is attached to a lower portion 44 of the door frame 42 and the outer armrest substrate 16 is attached to an upper portion 40 of the door frame 42. A first buckling member 50 extends along a front edge 52 of the armrest substrate, between the inner and outer armrest substrates 12, 16, wherein the first buckling member 50 defines a front boundary 54 of the gap 18 extending between the inner and outer armrest substrates 12, 16. A second buckling member 56 extends along a rear edge 60 of the armrest substrate, between the inner and outer armrest substrates 12, 16. The second buckling member 56 defines a rear boundary 58 of the gap 18 extending between the inner and outer armrest substrates 12, 16. The gap 18 is configured to extend substantially the length of the inner and outer armrest substrates 12, 16. The fabric member 20 attaches to the inner and outer armrest substrates 12, 16 and spans the gap 18 such that the fabric member 20 provides the primary vertical support for those portions of the fabric substrate armrest 10 disposed within the outer extent of the gap 18.

Referring now to the embodiment of FIGS. 3 and 4, a first edge 70 of the fabric member 20 is coupled to the inner armrest substrate 12, wherein the inner armrest substrate 12 includes at least one slot 72. The first edge 70 of the fabric member 20 includes a fastening member 74 that is configured to engage the slot 72 of the inner armrest substrate 12. A second edge 76 of the fabric member 20 is configured to attach to the outer armrest substrate 16, such that the fabric member 20 is tensioned across the gap 18 to vertically support the arm of an occupant at those portions defined within the outer extent of the gap 18.

As illustrated in the embodiment of FIGS. 2-5, the first edge 70 of the fabric member 20 can include a plurality of fastening members 74 that engage a corresponding plurality of slots 72 defined within the inner armrest substrate 12. The fastening member 74 can include a hook 80 that engages a corresponding slot 72. The fastening member 74 can also include an interference tab 82 that engages a cooperative tab 84 proximate the slot 72 to substantially couple the first edge 70 of the fabric member 20 to the inner armrest substrate 12. In various embodiments, the inner armrest substrate 12 can include a single slot 72 that is configured to receive a plurality of fastening members 74 from the first edge 70 of the fabric member 20. Alternatively, the fabric member 20 can include a single fastening member 74 that couples with a single slot 72 of the inner armrest substrate 12. It is also contemplated that the corresponding slots 72 and fastening members 74 described above can be disposed on the outer armrest substrate 16 and the second edge 76 of the fabric member 20. It is further contemplated that the first and second edges 70, 76 of the fabric member 20 can each include fastening members 74 that engage cooperating slots 72 defined within each of the inner and outer armrest substrates 12, 16.

In various embodiments, the fabric member 20 can be made of various flexible fabric materials that can include, but are not limited to, cotton, fabric, plastic, vinyl, metallic fabric, wire mesh, and other substantially fabric-type materials that can be disposed upon and formed around the inner and outer armrest substrates 12, 16. Additionally, in various embodiments, the fabric member 20 can be a Class A flame-retardant fabric. It is contemplated that, in various embodiments, the fabric member 20 can be at least partially elastic so that the fabric member 20, when tensioned across the gap 18, can at least partially stretch to afford the user of the vehicle 26 comfort when resting an arm upon the fabric substrate armrest 10. In the embodiments described above, the tensioning force placed upon the fabric member 20 that extends between the inner and outer armrest substrates 12, 16 is configured to provide a location on which the occupant can rest their arm for comfort while within the vehicle 26. The combination of the cover member 22 and the fabric member 20 is configured to provide at least some vertical displacement when the occupant places their arm upon the fabric substrate armrest 10. In such an embodiment, the cover member 22 and the fabric member 20 provide a cushioned surface to the occupant. In other embodiments, as will be described more fully below, various cushioning members can be added to the armrest substrate to provide additional padding for the occupant using the fabric substrate armrest 10.

In the various embodiments, the cover member 22 can be made of a variety of materials that can include, but are not limited to, leather, PVC, TPO, plastic, vinyl, combinations thereof, or other similar materials. The cover member 22 is configured to extend over the inner and outer armrest substrates 12, 16, the buckling members 14 and the fabric member 20. It is contemplated that the cover member 22 can be tensioned over the fabric substrate armrest 10, or can be fastened or adhered thereto.

As illustrated in the embodiment of FIG. 4, the first and second buckling members 50, 56 can define portions of the fabric substrate armrest 10, wherein the fabric substrate armrest 10 includes the inner and outer armrest substrates 12, 16 and the buckling members 14 that extend therebetween. Alternatively, first and second buckling members 50, 56 can be separate members that are attached to either the inner armrest substrate 12, the outer armrest substrate 16, or both. It is contemplated that in various embodiments, the buckling members 14 can be part of a fabric member frame that extends around and receives at least a portion of the fabric member 20. In such an embodiment, the fabric member frame is coupled to the inner and outer armrest substrates 12, 16.

Figure 12:
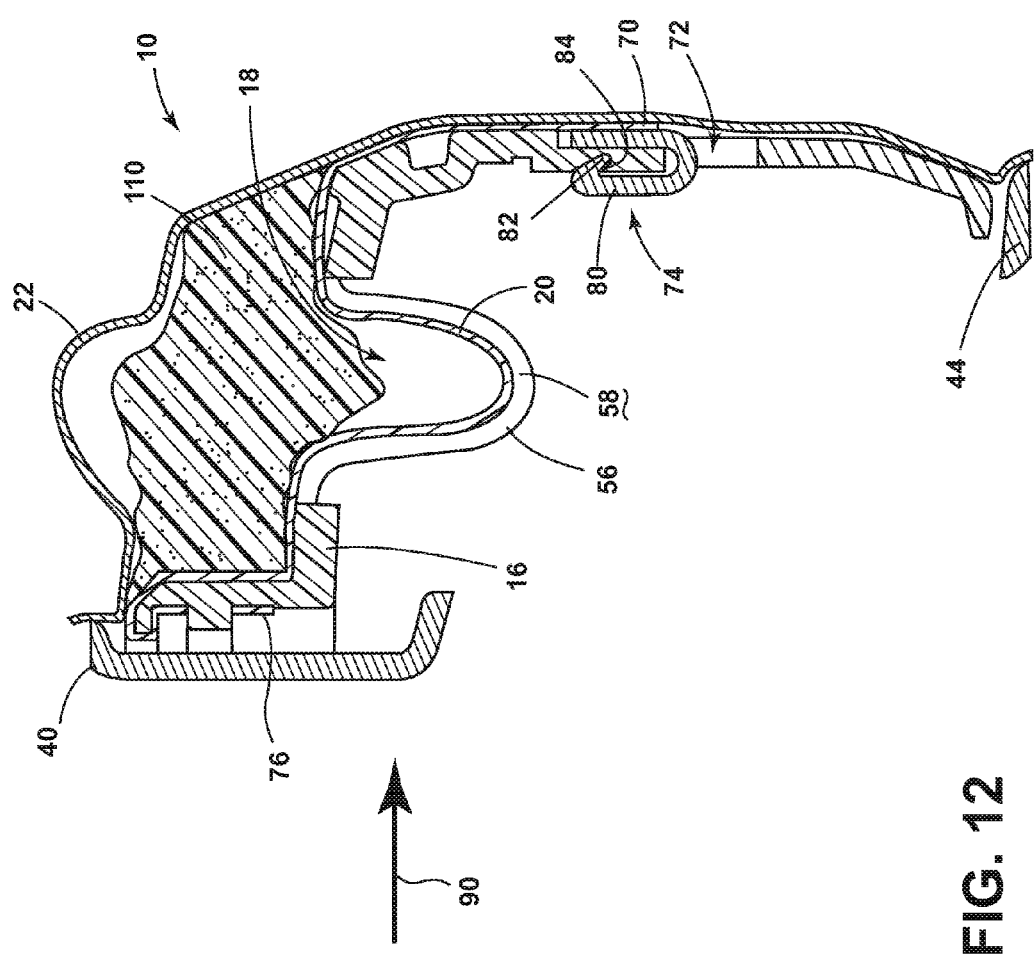
FIG. 12 is the cross-sectional view of the fabric substrate armrest of FIG. 10 with a side impact force applied to the armrest.

As illustrated in the embodiment of FIG. 12, the first and second buckling members 50, 56 define weakened portions of the fabric substrate armrest 10, such that lateral forces 90 disposed upon the fabric substrate armrest 10, such as in a side collision event, cause the first and second buckling members 50, 56 to bend or deflect to absorb at least a portion of the lateral force 90 applied to the fabric substrate armrest 10. The fabric member 20, being substantially flexible, provides minimal lateral support, if any, to the fabric substrate armrest 10 in the area of the gap 18 between the first and second buckling members 50, 56. In this manner, the fabric member 20 can provide vertical support at those portions of the armrest 10 used by the occupant, while also providing little, if any, lateral structure to the fabric substrate armrest 10, such that the first and second buckling members 50, 56 can deflect in a collision situation. The deflection of the first and second buckling members 50, 56 serves to minimize the distance that the fabric substrate armrest 10 projects into the cabin of the vehicle 26 as a result of the lateral force 90. In various embodiments, to allow the buckling members 14 to deflect when lateral forces 90 are applied, the first and second buckling members 50, 56 are configured to be weaker than the inner and outer armrest substrates 12, 16 in, at least, the lateral direction. This weakened condition can be accomplished by making the first and second buckling members 50, 56 from a separate and weaker material than the inner and outer armrest substrates 12, 16. The weakened condition can also be achieved by making the first and second buckling members 50, 56 to have a thinner cross-sectional area. Other configurations can include, but are not limited by, weakening notches or cutouts defined within the first and second buckling members 50, 56, scoring or thinned portions that define weaker areas of the first and second buckling members 50, 56 and other configurations.

In various embodiments, the armrest substrate, including the inner and outer armrest substrates 12, 16, and the buckling members 14, can be made of various materials that can include, but are not limited to, metal, plastic, composite, combinations thereof, as well as other substantially rigid materials. As discussed above, the inner and outer armrest substrates 12, 16 and the various buckling members 14 can be made of different materials, such that the buckling members 14 are configured to bend or deflect as a result of lateral forces 90, before bending or deflection occurs within the inner and outer armrest substrates 12, 16. It is also contemplated that the various buckling members 14 can include a plurality of buckling members 14 that extend between the inner and outer armrest substrates 12, 16 to define a plurality of gaps 18 extending between the inner and outer armrest substrates 12, 16.

Figure 6:
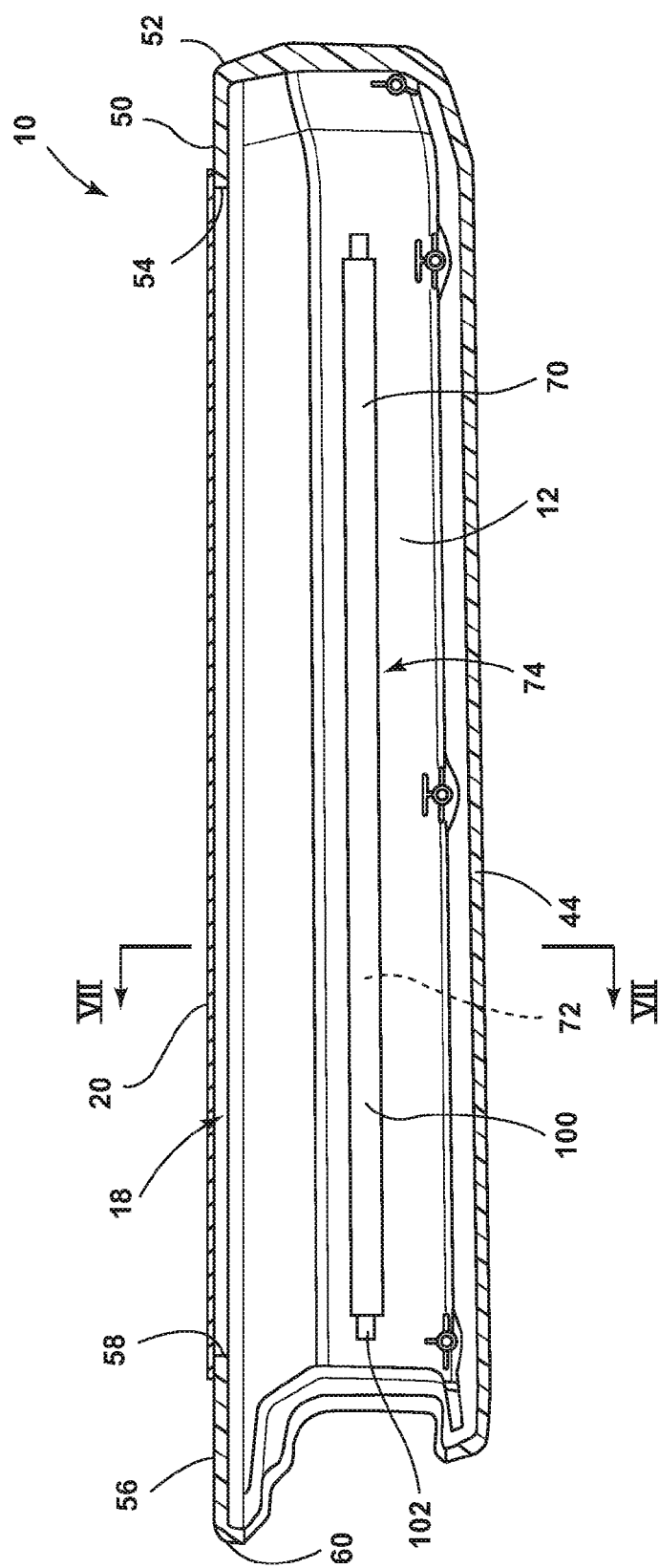
FIG. 6 is an alternate cross-sectional view of the fabric substrate armrest of FIG. 5 showing an alternate fastening member.
Figure 7:
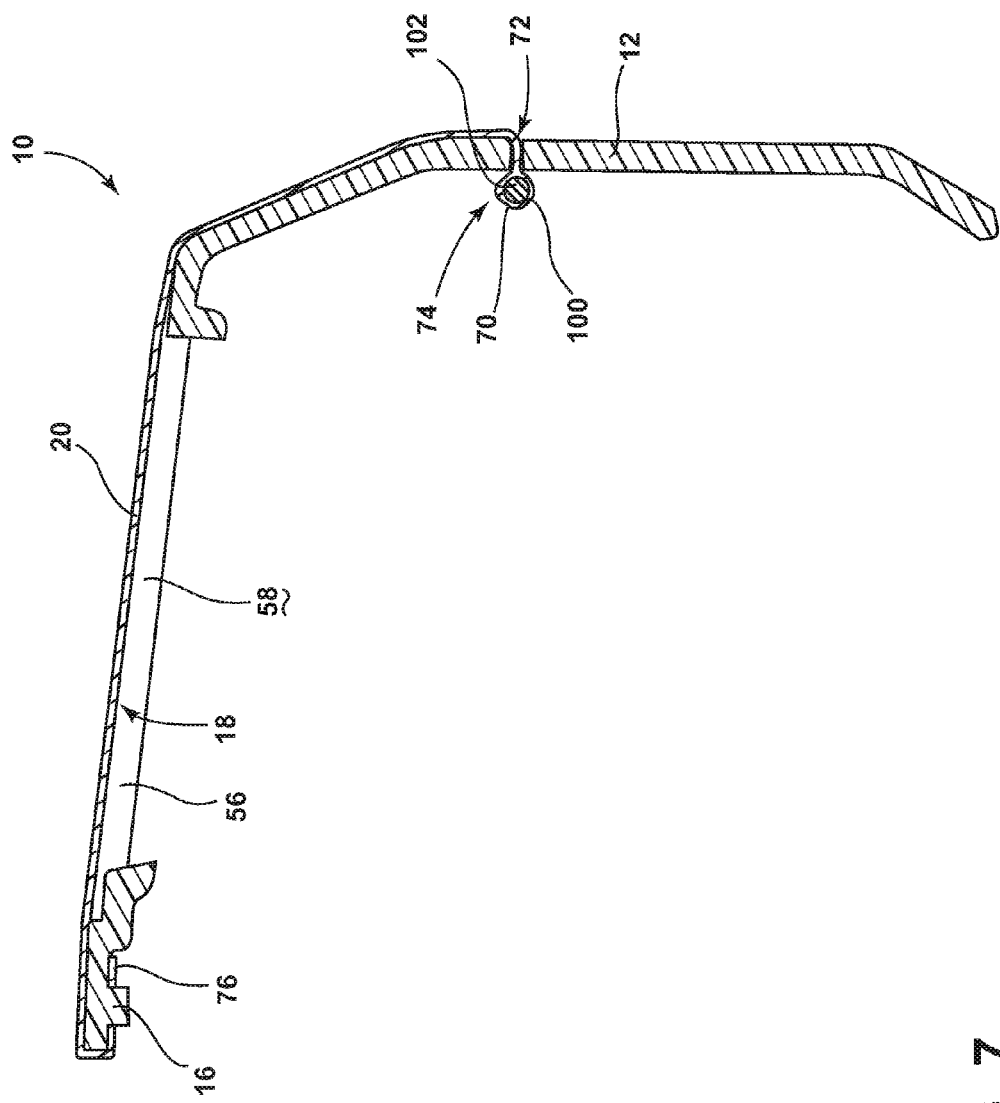
FIG. 7 is a cross-sectional view of the fabric substrate armrest of FIG. 6 taken at line VII-VII.
Figure 8:
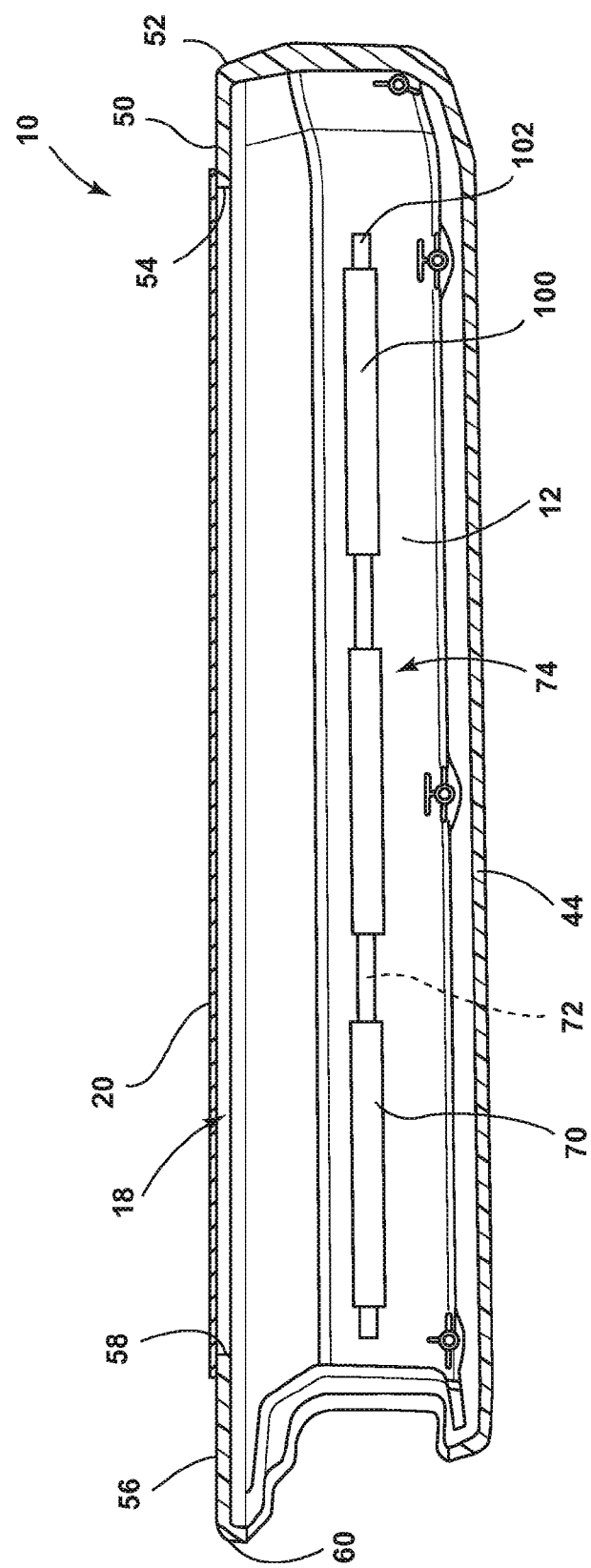
FIG. 8 is an alternate cross-sectional view of the fabric substrate armrest of FIG. 6 with an alternate slot configuration.
Figure 9:
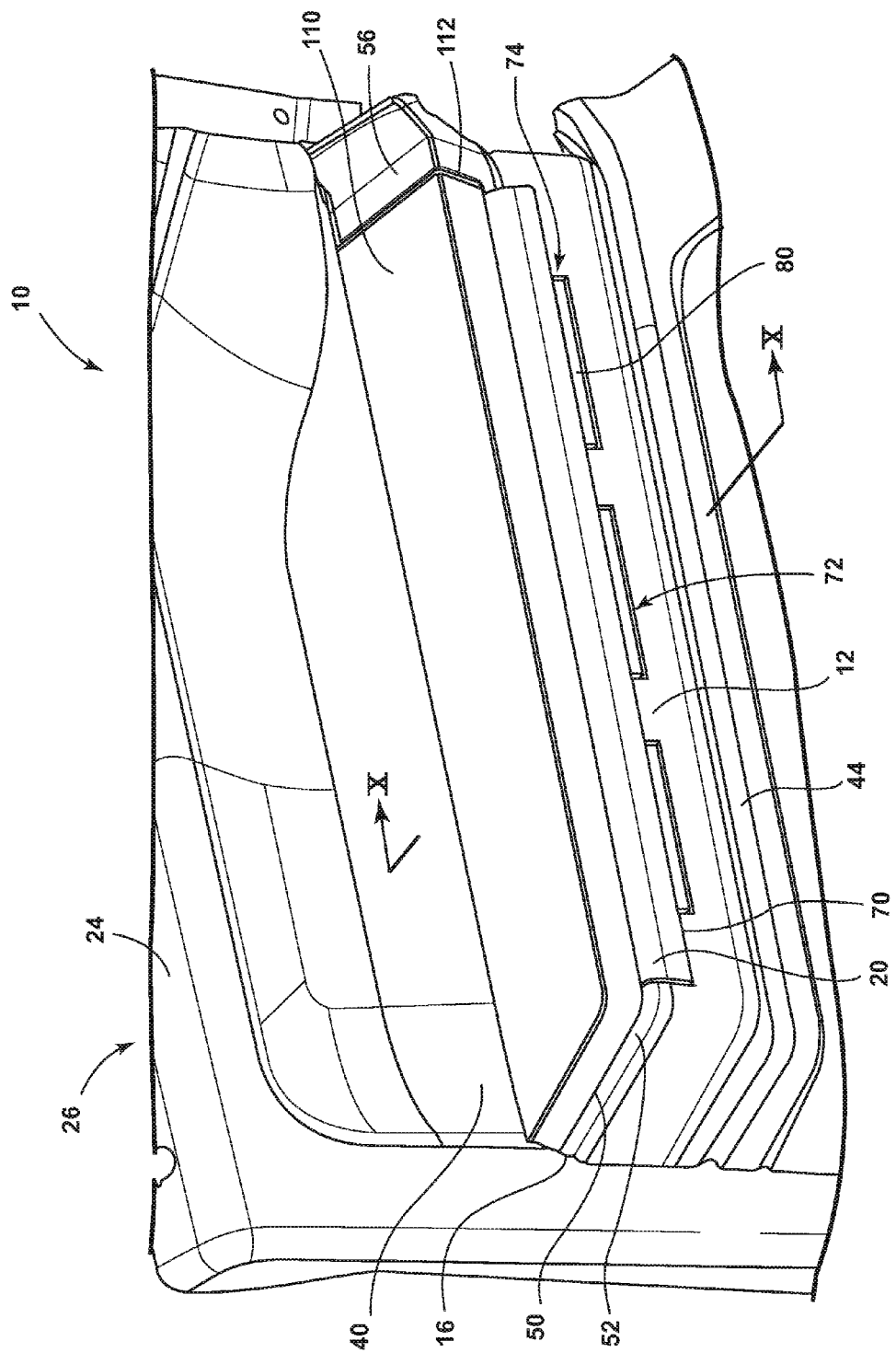
FIG. 9 is a top perspective view of another embodiment of the fabric substrate armrest.

Referring now to the embodiments illustrated in FIGS. 6-8, the first edge 70 of the fabric member 20 can include one or more looped features 100 or similar apertures that can be disposed through the one or more slots 72 of the inner armrest substrate 12. Once inserted through the slot 72, a retaining bar 102 can be slidably engaged through the looped features 100 such that the combination of the retaining bar 102 and looped features 100 are prevented from being pulled back through the slot 72 of the inner armrest substrate 12. This retention configuration creates the tension upon the fabric member 20 across the gap 18. It is contemplated that, as with the embodiments discussed above, the inner armrest substrate 12 can include a single slot 72 that is configured to receive a plurality of looped features 100 that receive a sliding member and couple the first edge 70 of the fabric member 20 to the inner armrest substrate 12. Alternatively, the first edge 70 of the fabric member 20 can include a single elongated loop feature that extends substantially the length of the first edge 70 of the fabric member 20, wherein the single looped feature 100 is disposed through a single slot 72 defined within the inner armrest substrate 12. As with the embodiments discussed above, the second edge 76 of the fabric member 20 can include one or more looped features 100 as discussed above that engage corresponding slots 72 that are defined within the outer armrest substrate 16. It is further contemplated that the first and second edges 70, 76 of the fabric member 20 can each include the looped features 100 and both the inner and the outer armrest substrates 12, 16 can include the slots 72 that cooperate with the looped features 100 of the fabric member 20.

In various embodiments, the fabric member 20 can be attached to the inner and outer armrest substrates 12, 16 through methods apart from and/or in addition to those methods described above. Such methods can include, but are not limited to, mechanical-type fasteners, interference-type fasteners, adhesives, welding, staples, tensioning mechanisms, and other similar attachment methods. Additionally, these attachment methods may be used to couple the fabric member 20 to a fabric frame that surrounds the fabric member 20. In such an embodiment, when the fabric member 20 is attached to the fabric frame, the fabric member 20 is tensioned within the frame and the frame is attached to the inner and outer armrest substrates 12, 16.

Referring now to the embodiment shown in FIGS. 9-12, the fabric substrate armrest 10 can include a cushion member 110 that is disposed upon, and is vertically supported by, the tensioned fabric member 20. The cushion member 110 and the fabric member 20 can be covered by the cover member 22. The inner and outer armrest substrates 12, 16 can include a recessed portion 112 that is configured to receive at least a portion of the cushion member 110, such that the fabric substrate armrest 10 has a substantially level top surface for supporting the occupant's arm. It is contemplated that the cushion member 110 can be partially supported by the inner and outer armrest substrates 12, 16 and the buckling members 14 at the perimeter of the cushion member 110. In the various embodiments, it is contemplated that the primary vertical support for the cushion member 110 at the gap 18 is from the fabric member 20 that is tensioned across the gap 18.

Figure 10:
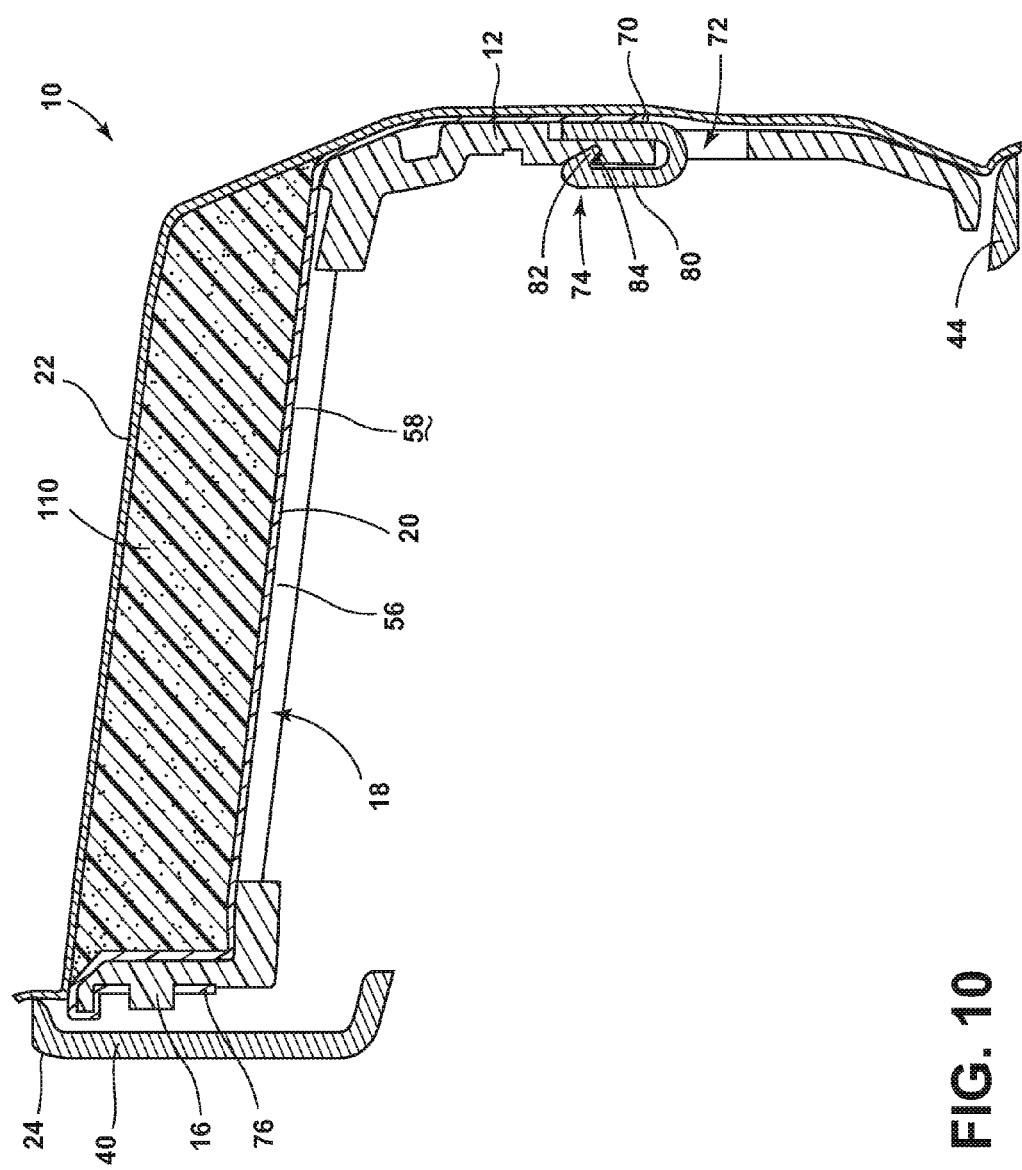
FIG. 10 is a cross-sectional view of the fabric substrate armrest of FIG. 9 taken at line X-X.
Figure 11:
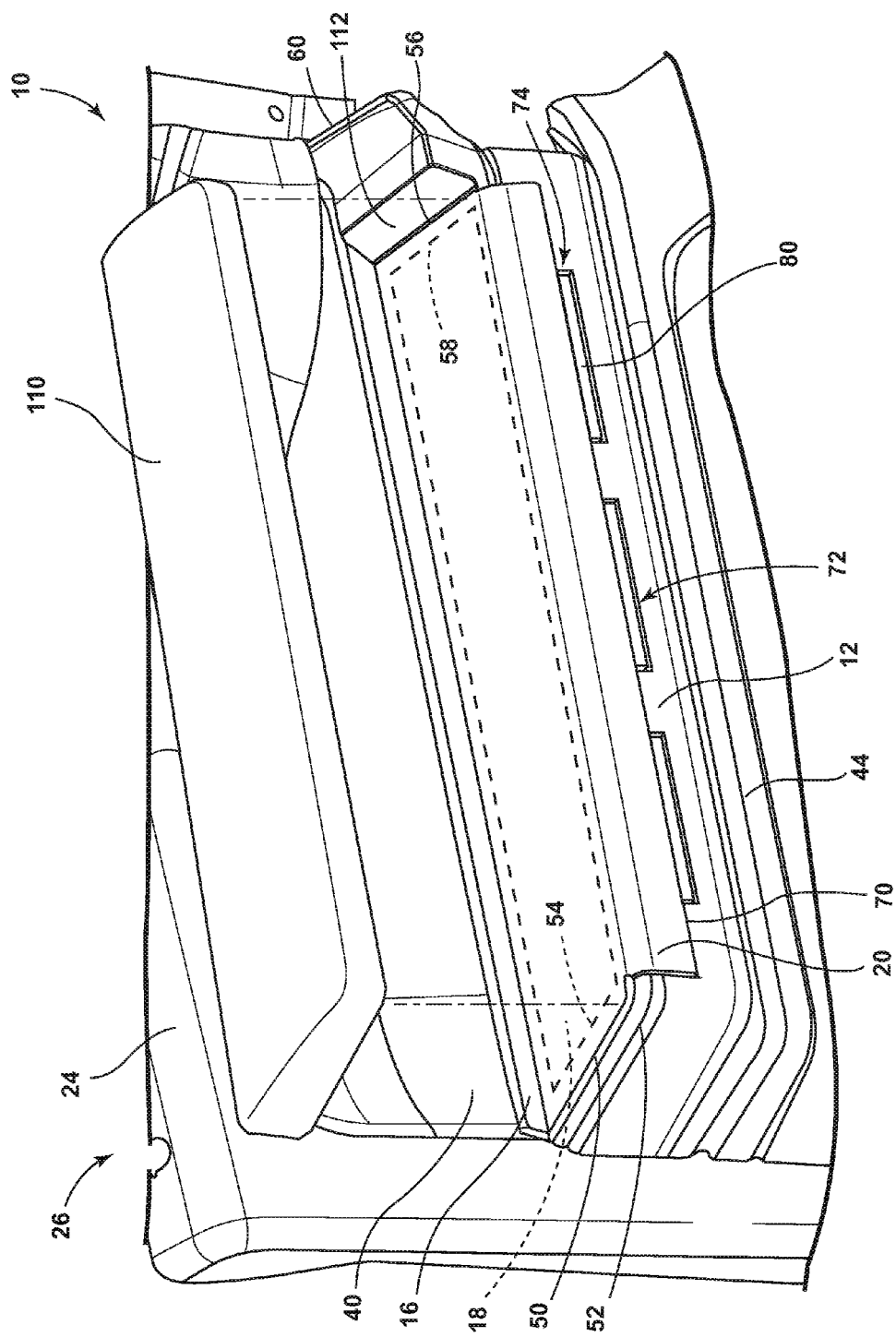
FIG. 11 is a partially exploded top perspective view of the fabric substrate armrest of FIG. 9 with the cover and cushion member removed.

Referring now to the embodiment of FIGS. 10 and 12, embodiments of the fabric substrate armrest 10 that include a cushion member 110 operate substantially similar to those embodiments that have no cushion member 110, as described above. Where a lateral force 90 is applied to the fabric substrate armrest 10, such as from a side impact, the first and second buckling members 50, 56, being weakened portions of the fabric substrate armrest 10, are configured to buckle before the inner and outer armrest substrates 12, 16, such that the outer armrest substrate 16 can move toward the inner armrest substrate 12 to absorb the lateral forces 90 from the impact. In this manner, the inner armrest substrate 12 experiences a lesser lateral displacement toward the inner portions of the cabin as a result of the deflection of the first and second buckling members 50, 56 and the movement of the outer armrest substrate 16 toward the inner armrest substrate 12. This configuration also can slow the velocity that the inner armrest substrate 12 can move inward toward the cabin area due to the first and second buckling members 50, 56 absorbing a portion of the lateral force 90. This configuration allows the outer armrest substrate 16 to experience a greater lateral displacement than the inner armrest substrate 12. The cushion member 110 in the above-described embodiment provides minimal, if any, lateral structure that might serve to bolster the first and second buckling members 50, 56 that span the gap 18 between the inner and outer armrest substrates 12, 16. In this manner, the cushion member 110 experiences substantially the same amount of deflection or compression as the first and second buckling members 50, 56, without adding lateral structural support at the gap 18 of the fabric substrate armrest 10.

Figure 13:
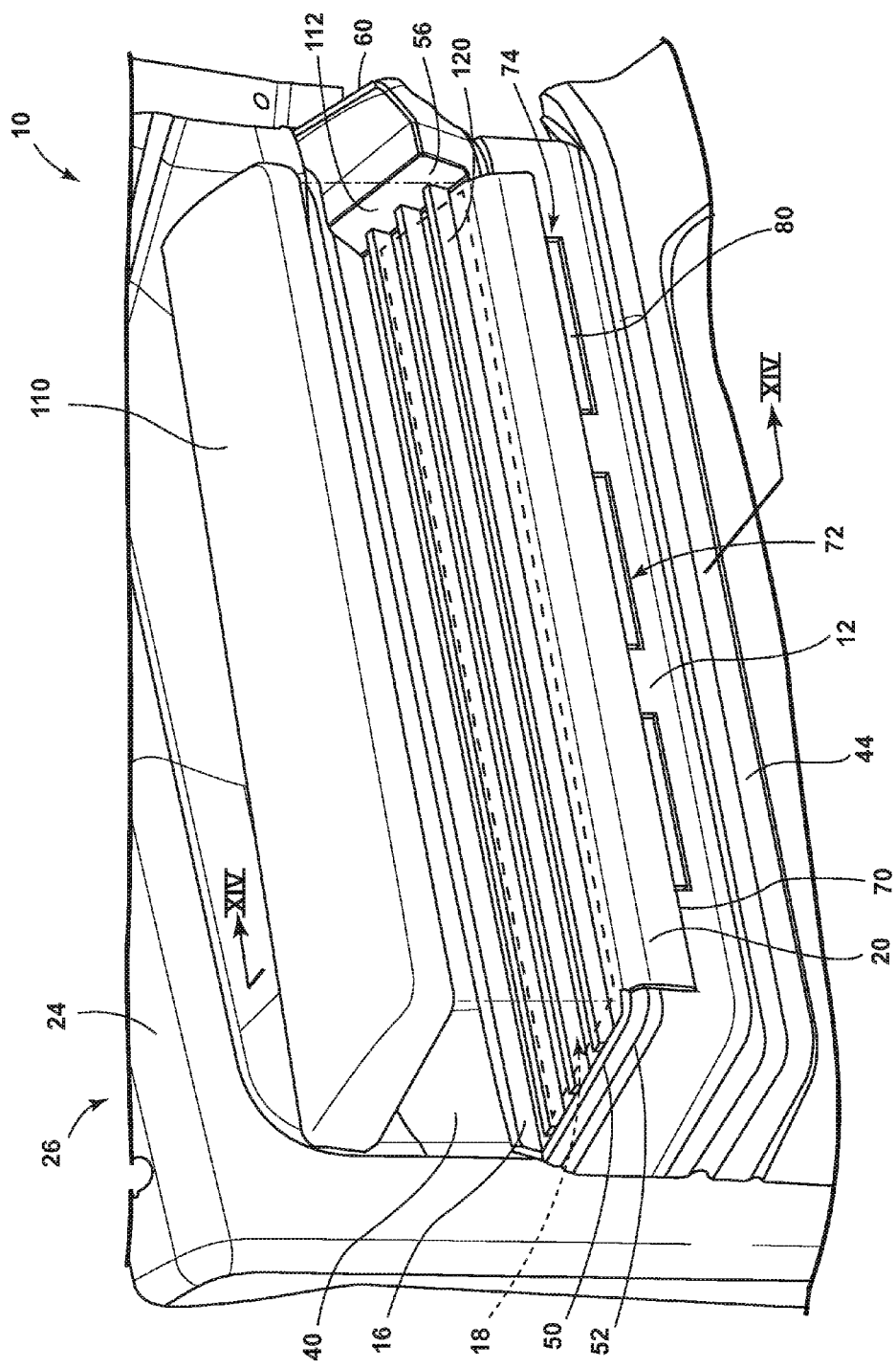
FIG. 13 is a partially exploded top perspective view of another embodiment of the fabric substrate armrest with the cover and the cushion member removed.
Figure 14:
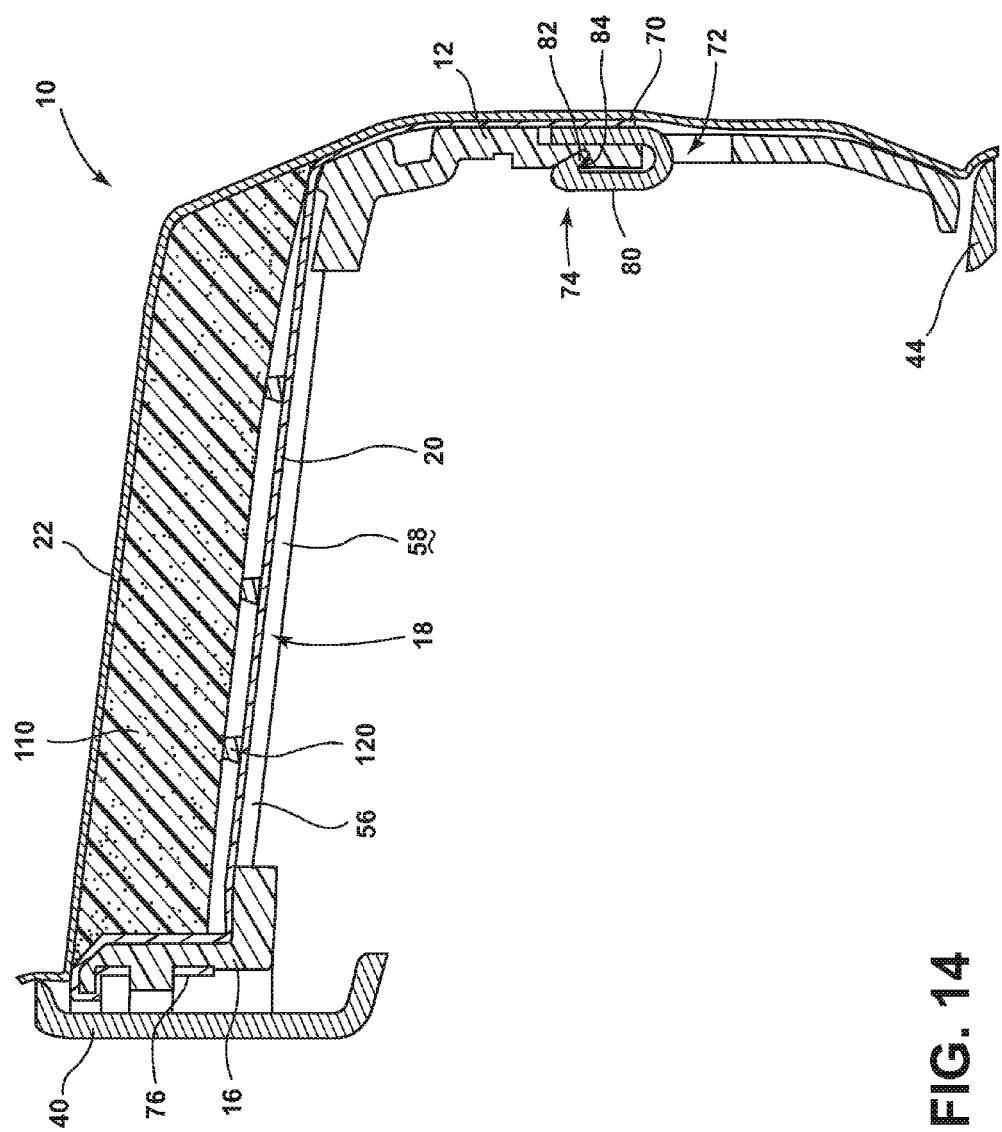
FIG. 14 is a cross-sectional view of the fabric substrate armrest of FIG. 13, taken at line XIV-XIV.
Figure 15:
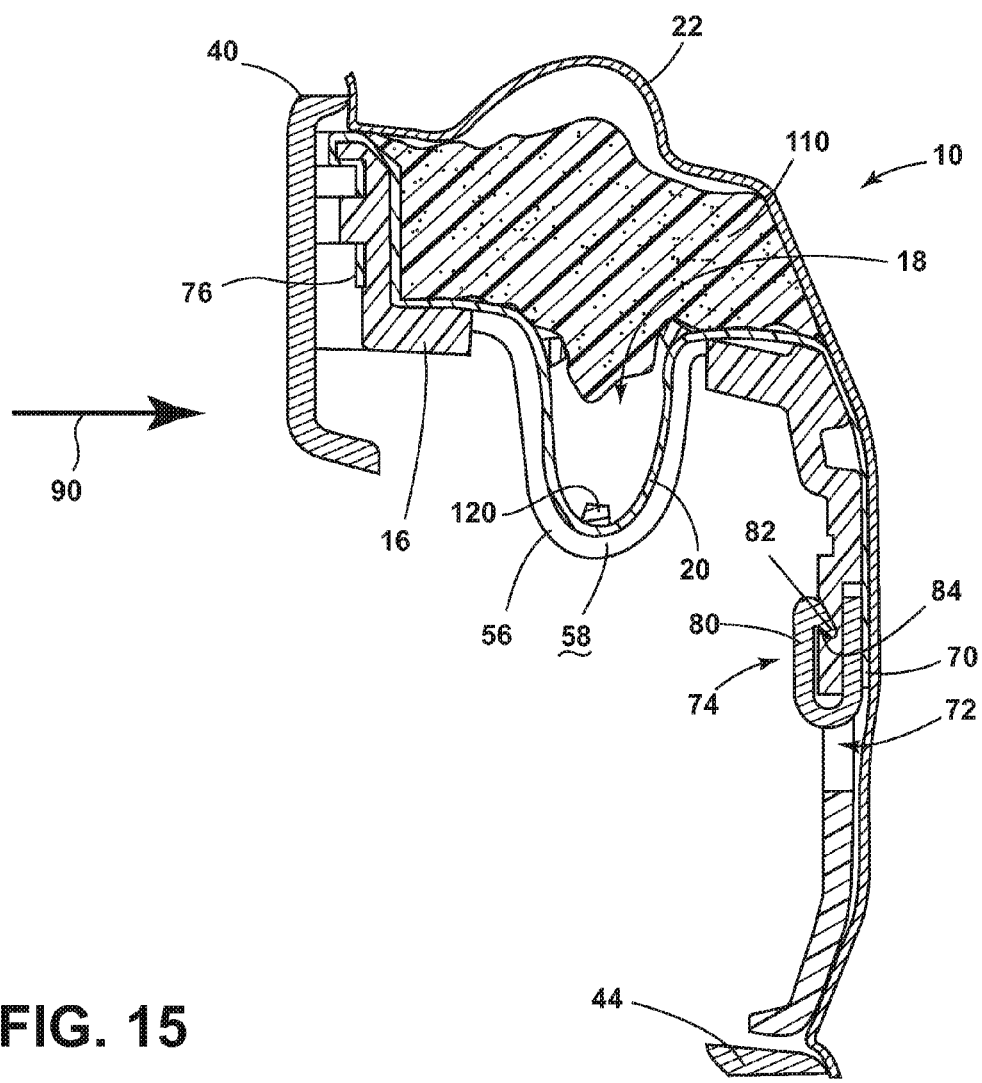
FIG. 15 is a cross-sectional view of the fabric substrate armrest of FIG. 14 with a side impact load applied to the armrest.

Referring now to the embodiment illustrated in FIGS. 13-15, one or more lateral bars 120 can be disposed across the gap 18 between the first and second buckling members 50, 56 to provide additional vertical support to the cushion member 110 and the occupant's arm. The lateral bars 120 are configured to be free of engagement with either of the inner or outer armrest substrates 12, 16, such that the lateral bars 120 provide an under-cushion vertical support, but do not provide additional lateral support across the gap 18 between the inner and outer armrest substrates 12, 16. The lateral bars 120 are shown a being oriented perpendicular with the first and second buckling members 50, 56. It is contemplated that, in various embodiments, the lateral bars 120 can be oriented in other non-perpendicular configurations, so long as the lateral bars 120 do not inhibit the deflection of the first and second buckling members 50, 56. The lateral bars 120 can be made of various substantially rigid materials that include, but are not limited to, plastic, metal, composite, PVC, and other rigid-type materials.

In various embodiments, the lateral bars 120 can be placed upon the buckling members 14 or can be placed upon tabs or notches of the first and second buckling members 50, 56, such that the lateral bars 120 do not provide additional lateral structure along the length of the first and second buckling members 50, 56 that might inhibit the deflection of the first and second buckling members 50, 56 when the lateral forces 90 are applied to the fabric substrate armrest 10. In this manner, the lateral bars 120 are configured to move and be displaced by the deflective movement of the first and second buckling members 50, 56 when lateral forces 90 are applied to the fabric substrate armrest 10. Accordingly, the lateral bars 120 and the fabric member 20 provide vertical support to the cushion member 110 without substantially adding to the lateral strength of the fabric substrate armrest 10 at the gap 18 and the first and second buckling members 50, 56. In various embodiments, the fabric member 20 can be placed over the lateral bars 120, or, the fabric member 20 can be placed through apertures in the lateral bars 120, wherein the tensioning force of the fabric member 20 being stretched across the gap 18 substantially holds the lateral bars 120 in place. In this manner, the lateral bars 120 can be minimally engaged with the first and second buckling members 50, 56. The lateral bars 120 can also be attached to the fabric frame member, as described above, where the fabric frame member includes the buckling members 14, and is attached to the inner and outer armrest substrates 12, 16.

In various embodiments, it is contemplated that the cover member 22 can include a cushioned portion, such that the cushioned portion of the cover member 22 is disposed at the gap 18 of the fabric substrate armrest 10, wherein the cushioned portion of the cover is supported by the first and second buckling members 50, 56. Additionally, in various embodiments, the fabric substrate armrest 10 can include a handle that can be used to open and close the door 24 to which the fabric substrate armrest 10 is attached. The fabric substrate armrest 10 can also include various cup holders, containers, and other storage areas. It is contemplated that the handle and storage areas included in the fabric substrate armrest 10 do not substantially add lateral support to the first and second buckling members 50, 56.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle armrest comprising:
    inner and outer armrest substrates having at least one buckling member extending therebetween, wherein a gap is defined by the inner and outer armrest substrates and the at least one buckling member, wherein the gap extends substantially a length of the inner and outer armrest substrates;
    a fabric member extending continuously across the gap and attached to the inner and outer armrest substrates;
    a cover member extending over and vertically supported by the fabric member; and
    at least one lateral support member substantially parallel with and free of engagement with the inner and outer armrest substrates, the at least one support member positioned on the fabric member and vertically supporting the cover member from below.

2. The vehicle armrest of claim 1, wherein a slot is defined within at least one of the inner and outer armrest substrates, and wherein the fabric member is attached to at least one of the inner and outer armrest substrates at the slot.

3. The vehicle armrest of claim 1, wherein at least one fabric slot is defined within at least one of the inner and outer armrest substrates, and wherein the fabric member is attached to the armrest substrate at the at least one fabric slot.

4. The vehicle armrest of claim 1, wherein the armrest substrate is attached to a door of a vehicle.

5. The vehicle armrest of claim 1, wherein the at least one buckling member includes a first buckling member defining a front boundary of the gap, and a second buckling member defining a rear boundary of the gap.

6. The vehicle armrest of claim 5, wherein the at least one lateral support member includes a plurality of support members that extend across the gap between the first and second buckling members, wherein the plurality of support members are free of engagement with one another.

7. The vehicle armrest of claim 6, further comprising:
    a cushion member disposed upon the plurality of support members and over the fabric member, wherein the plurality of support members and the cushion member are vertically supported by the fabric member, wherein the cushion member is disposed under the cover member.

8. A vehicle armrest comprising:
    an armrest substrate including an inner structure and an outer structure with a gap defined therebetween;
    a fabric member extending across the gap; and
    a lateral bar disposed on the fabric member and free of engagement with the inner and outer structures.

9. The vehicle armrest of claim 8, wherein the fabric member is attached to the inner and outer structures.

10. The vehicle armrest of claim 8, further comprising:
    a cover member extending over the armrest substrate, wherein the cover member is at least partially supported from below by the fabric member.

11. The vehicle armrest of claim 8, further comprising:
    at least one buckling member extending across the gap and between the inner structure and the outer structure, wherein the lateral bar engages the at least one buckling member.

12. The vehicle armrest of claim 11, wherein the at least one buckling member includes a plurality of buckling members, and wherein the plurality of buckling members divide the gap into a plurality of gaps.

13. The vehicle armrest of claim 11, wherein the at least one buckling member includes a first buckling member disposed at a front edge of the armrest substrate, and a second buckling member disposed at a rear edge of the armrest substrate, the lateral bar extending between the first and second buckling members.

14. The vehicle armrest of claim 13, wherein the lateral bar extends across the gap between the first and second buckling members and is free of engagement with the inner and outer structures.

15. A vehicular armrest comprising:
    an armrest substrate including first and second buckling members, wherein a gap is defined within the armrest substrate and between the first and second buckling members;
    a cover member attached to the armrest substrate;

a fabric member extending over the armrest substrate and positioned under the cover member, wherein the fabric member spans the gap and provides vertical support to portions of the cover member proximate the gap; and a lateral support member extending between and disposed on the fabric member and the first and second buckling members, the lateral support member supporting the cover member from below.

16. The vehicular armrest of claim 15, wherein at least one fabric slot is defined within the armrest substrate, and wherein the fabric member is attached to the armrest substrate at the at least one fabric slot.

17. The vehicular armrest of claim 15, wherein the first buckling member is disposed at a front edge of the armrest substrate, and the second buckling member is disposed at a rear edge of the armrest substrate.

18. The vehicular armrest of claim 15, further comprising a cushion member disposed under the cover member and vertically supported by the lateral support member.

19. The vehicular armrest of claim 18, wherein the lateral support member extends across the gap between the first and second buckling members and is free of engagement with the inner and outer armrest substrates.

20. The vehicular armrest of claim 18, wherein the cover member is part of the cushion member.

* * * * *